United States Patent

[11] 3,591,193

| [72] | Inventor | David L. Mitchell, Jr. |
|---|---|---|
| | | Riverview Road, Glenwillard, Pa. 15046 |
| [21] | Appl. No. | 876,680 |
| [22] | Filed | Nov. 14, 1969 |
| [45] | Patented | July 6, 1971 |

[54] MOLDED ARTICULATED SLED
3 Claims, 6 Drawing Figs.

[52] U.S. Cl. .................................................. 280/16
[51] Int. Cl. ........................................... B62b 13/04
[50] Field of Search .......................................... 280/15, 16, 17, 18, 19, 21, 504

[56] References Cited
UNITED STATES PATENTS
2,449,336 9/1948 Spitzwieser.................. 280/16
3,151,876 10/1964 Hahto............................ 280/16
3,372,944 3/1968 Lauritzen ..................... 280/17

*Primary Examiner*—Benjamin Hersh
*Assistant Examiner*—Robert R. Song
*Attorney*—Buell, Blenko and Ziesenheim ABSTRACT: A molded articulated sled having a semihemispherical front and elongated rear section with mated bearing surfaces pivotally connected together. The rear section extending into the front section and having a shape conforming generally to the shape of the front; both of the sections having longitudinal runners adapted to receive coaster wheels and axles.

INVENTOR
David L. Mitchell, Jr.

PATENTED JUL 6 1971  3,591,193

INVENTOR
David L. Mitchell, Jr.

MOLDED ARTICULATED SLED

The present invention relates to a sled and, in particular, a molded articulated sled that is convertible to a coaster.

In the past, sleds have been provided with various means for steering, including the standard positioning of runners. Elaborate steering mechanisms have been devised, such as shown in U.S. Pat. No. 3,097,861, and others not quite as elaborate, for example, U.S. Pat. No. 3,414,284. While many sleds provide improved steering potential, particularly the more elaborate systems, they are costly to build and are not subject to simple construction techniques. Those that lend themselves to inexpensive and simple construction are usually not as steerable or as safe as they could be.

Furthermore, sleds of the past have been designed so as to be operable only on a particular type of surface. Most sleds are either of the thin runner design, which is particularly suitable for well compacted snow or ice, or of the very broad based type, that is, where the belly of the sled comprises the runner. Notwithstanding certain improvements in sliding performance, sleds have not been designed to function on surfaces other than snow or ice, which limits their utility to only a small portion of the year.

I have overcome most of the disadvantages of conventional sleds. I provide a sled that is well adapted to simple and inexpensive production techniques. My sled can be made of a plastic and is suited to injection molding or vacuum forming. Even though I provide a sled that permits the utilization of simple, inexpensive fabrication techniques, the sled is extremely steerable and safe. I also provide a sled that is convertible into a coaster for use when typical sledding conditions are not available. As a coaster, the steerability is as good as when the sled functions on ice or snow.

Generally, I provide a sled having an articulated front and rear section. The front section is of a semihemispherical shape opening to the rear. The bottom includes a pair of substantially flat bottomed runners and a floor having depressed parabolic portion extending between the inner uprights of the runners.

The rear section is elongated and wider in the aft than the fore. The fore portion is adapted to fit within the front section and has a fore wall conforming generally in shape to the front section. The floor section is depressed and rides in the depressed parabolic portion of the front section. The depressed floors coact to provide a bearing surface. A pivot pin extends between the bearing surfaces and is used to connect the two sections in articulation.

The aft portion of the rear section includes longitudinal runners and an undulating floor extending between the inner parts of the runners. The undulating floor provides a restful sitting arrangement for the rider. The front section provides protection for the rider's legs when they are positioned within the hemispheric shape.

My invention will be more fully understood by a perusal of the following detailed description taken in connection with the accompanying drawings in which.

Figure 1:
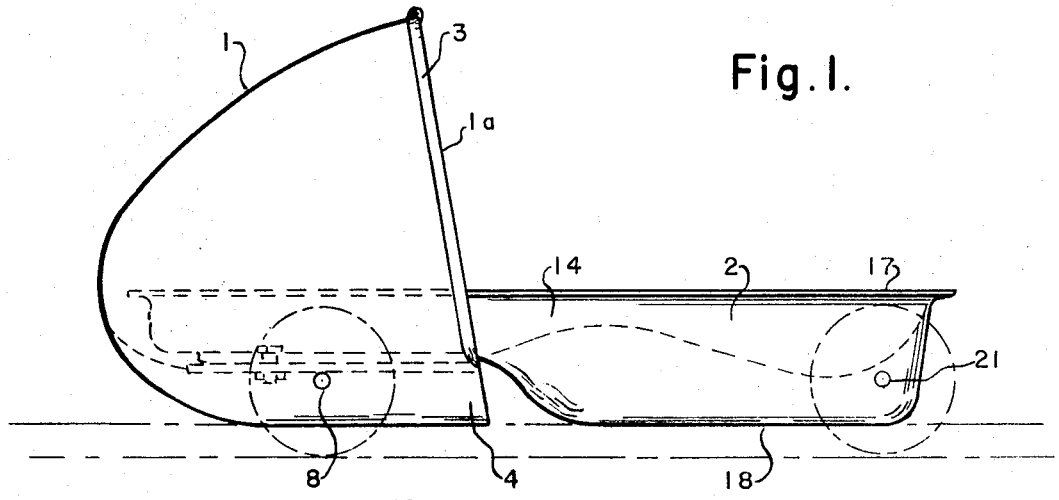
FIG. 1 is a side elevation of my sled.
Figure 2:
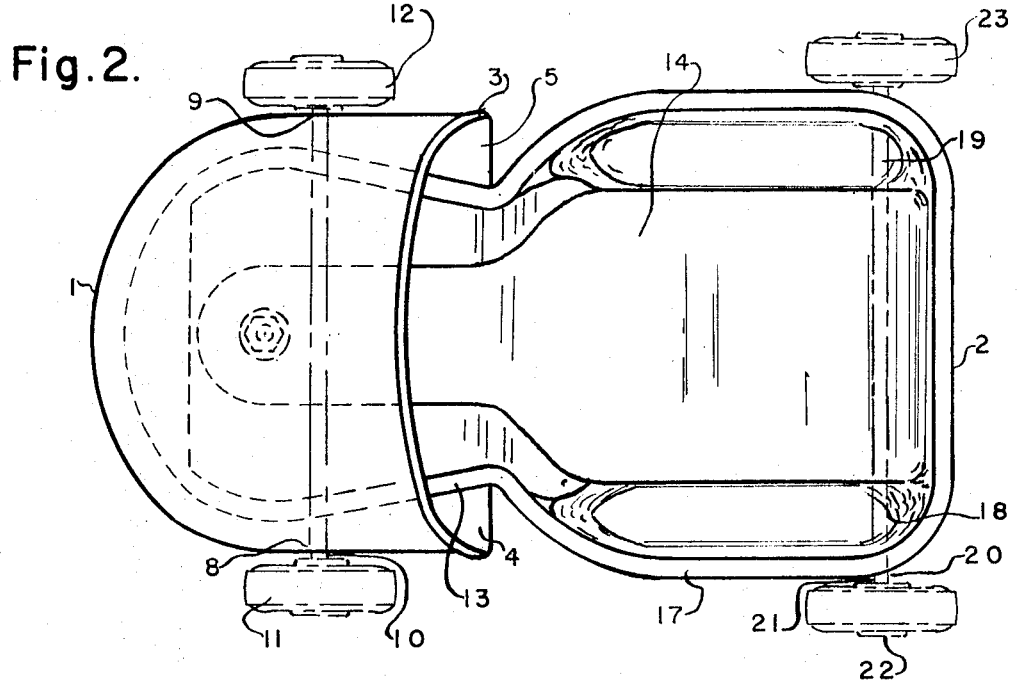
FIG. 2 is a top plan view of the sled with coaster wheels attached.
Figure 3:
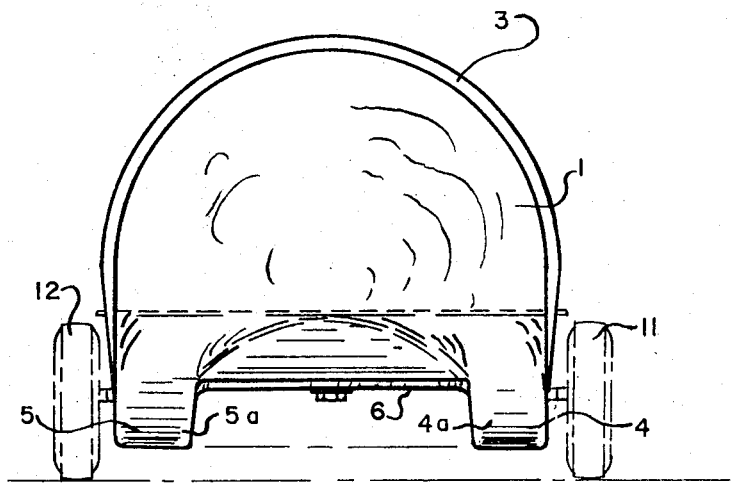
FIG. 3 is front elevation of sled with coaster wheels attached.
Figure 4:
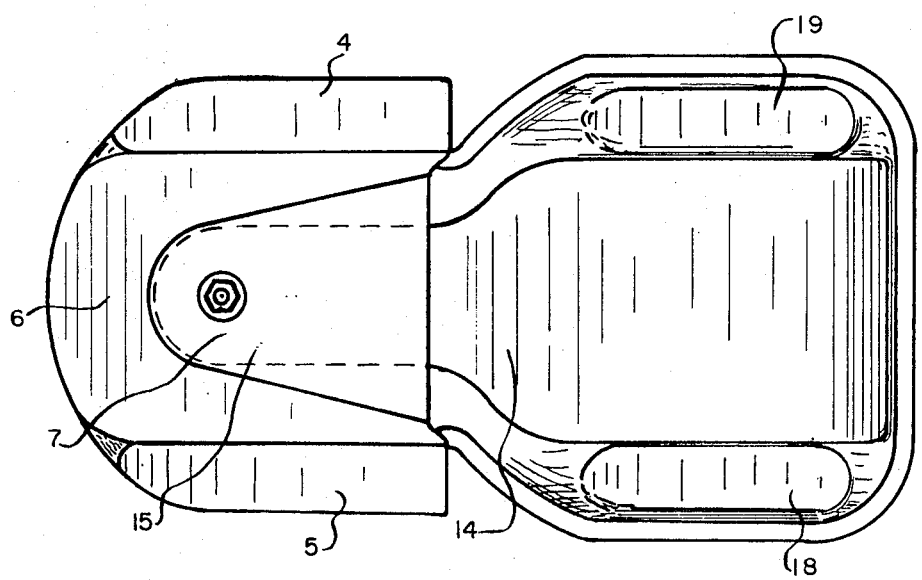
FIG. 4 is a bottom plan view of my sled without coaster wheels.
Figure 5:
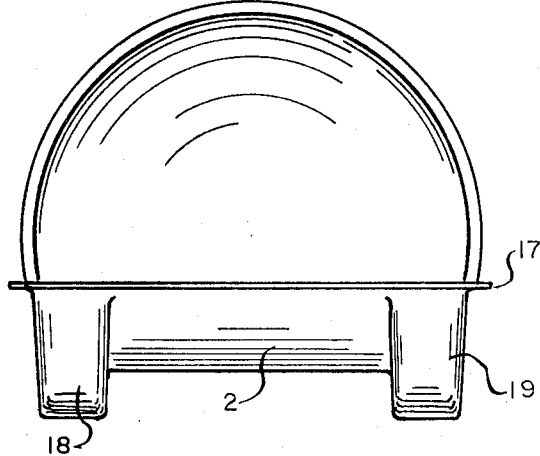
FIG. 5 is rear elevation of my sled.
Figure 6:
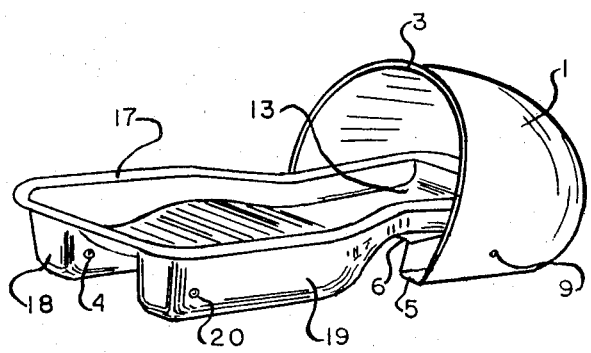
FIG. 6 is a perspective view of my sled.

Referring to FIG. 1, my sled includes front section 1 having a substantially hemispherical shape, except for the bottom, and a rear section 2 of generally elongated configuration. Front section 1 preferably includes a semicircular flange 3 around opening 1a. Flange 3 is useful for holding and steering the sled and may also have hand grips molded therein (not shown) which facilitate handling by children. Front section 1 includes a pair of longitudinal runners 4 and 5. Extending between the inner uprights 4a and 5a of runners 4 and 5, respectively, is floor 6 with a depression 7 therein of generally parabolic configuration. Depression 7 extends from the aft portion of the inner uprights of longitudinal runners 4 and 5 to a point slightly ahead of the midsection of floor 6. Longitudinal runners 4 and 5 are molded or formed with openings 8 and 9 through which a coaster axle 10 can be mounted having wheels 11 and 12.

Rear section 2 is elongated and includes a fore portion 13 adapted to fit within the front section 1. Fore portion 13 of section 2 preferably conforms to the radius of the front section and includes a floor 14 having a depression 15 that conforms to the radius of front parabolic depression 7. Depressions 7 and 15 provide bearing surfaces, with the rear section riding on the front section. Bolt or pin 16 pivotally connects front and rear sections for articulation. Steering is accomplished by pivoting the front section about the pin. The bearing surfaces are designed to relieve much of the force that would otherwise be placed on bolt or pivot pin 16.

Rear section 2 preferably includes flange 17 that extends around that part of the perimeter that does not fit within the front section. Flange 17 provides a degree of reinforcement to the elongated rear section. Floor 14 is preferably undulating at the aft section to provide seating comfort for the rider and extends between longitudinal runners 18 and 19. Molded into runners 18 and 19 are holes 20 and 21 to hold an axle 22 with wheels 23 and 24.

Steering my sled on either snow or as a coaster on a dry surface is accomplished simply turning front section 1 about the pivot pin by grasping flange 3. The front section will turn to the extent permitted by depressions 7 and 15 that form the bearing surface. A small child sitting on the undulating portion of floor 17 will sit with his feet extending into the fore part of rear section 2, and will be protected to a large degree by front hemispherical design of section 1.

I prefer to fabricate my sled from a plastic such as high density polyethylene. For example, the front section can be vacuum molded from a 24 inch by 24 inch, 3/16 inch blank to provide a front 18 inches wide, 16 inches in height and 16 inches long. The rear section can be molded from a blank 24 inch by 42 inch to provide a rear section 35 inches in length having a floor to flange of approximately 2¼ inches high with runners 3 inches from floor to ground and 16 inches in length. The fore portion has a width approximately 15½ inches with an aft 18 inches. My sled can also be injection molded or any other convenient method.

I claim:

1. A molded articulated sled comprising
  A. a front section including a pair of opposing longitudinal integrally molded runners and a floor extending between said runners, said floor including a rearwardly diverging generally parabolic depression therein;
  B. a substantially elongated rear section extending within the front section and including a pair of opposing longitudinal integrally molded runners extending the length of said section outside the front section, a rear floor extending the length of said rear section and integrally molded therewith and including a depression molded therein positioned within the front section and conforming in part to the narrowest portion of the front depression, said conforming depressions comprising bearing surfaces; and
  C. means for pivotally connecting the bearing surfaces about a vertical axis together to provide articulation of the front and rear sections.

2. A sled as set forth in claim 1 wherein said front section is hemispherical in shape.

3. A sled as set forth in claim 1 wherein said runners of the front and rear sections include holes molded therein for receiving axles having wheels thereon to convert said sled to a coaster.